(12) United States Patent
Suwald

(10) Patent No.: US 10,846,503 B2
(45) Date of Patent: Nov. 24, 2020

(54) FINGERPRINT SENSING DEVICE

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/297,640

(22) Filed: Mar. 9, 2019

(65) Prior Publication Data

US 2019/0286868 A1 Sep. 19, 2019

(30) Foreign Application Priority Data

Mar. 19, 2018 (EP) .................................. 18162660

(51) Int. Cl.
*G06K 9/00* (2006.01)
*G06K 19/07* (2006.01)

(52) U.S. Cl.
CPC ....... *G06K 9/0002* (2013.01); *G06K 9/00053* (2013.01); *G06K 19/0718* (2013.01)

(58) Field of Classification Search
CPC ............. G06K 9/0002; G06K 19/0718; G06K 9/00053
See application file for complete search history.

(56) References Cited

U.S. PATENT DOCUMENTS

| | | |
|---|---|---|
| 5,953,441 A | 9/1999 | Setlak |
| 2003/0035572 A1* | 2/2003 | Kalnitsky ............... G06F 3/044 382/124 |
| 2016/0171275 A1 | 6/2016 | Wang et al. |
| 2016/0343634 A1 | 11/2016 | Erhart et al. |
| 2018/0144170 A1 | 5/2018 | Suwald |
| 2018/0218192 A1 | 8/2018 | Suwald |
| 2018/0330138 A1 | 11/2018 | Suwald |

FOREIGN PATENT DOCUMENTS

| | | |
|---|---|---|
| EP | 0 902 387 A2 | 3/1999 |
| WO | 03/049012 A2 | 6/2003 |
| WO | 2014/099514 A1 | 6/2014 |

OTHER PUBLICATIONS

Extended European Search Report for Patent Appln. No. 18162660.7 (dated Oct. 5, 2018).

* cited by examiner

*Primary Examiner* — Abhishek Sarma

(57) ABSTRACT

In accordance with a first aspect of the present disclosure, a fingerprint sensing device is provided, comprising: a substrate; a fingerprint sensor placed on one side of the substrate; a coupling electrode placed on another side of the substrate, wherein said coupling electrode is arranged to provide a coupling capacitance between a surface of a finger and a circuit ground of said fingerprint sensor. In accordance with a second aspect of the present disclosure, a corresponding method of producing a fingerprint sensing device is conceived.

17 Claims, 9 Drawing Sheets

FINGERPRINT SENSING DEVICE

CROSS-REFERENCE TO RELATED APPLICATIONS

This application claims the priority under 35 U.S.C. § 119 of European patent application no. 18162660.7, filed on Mar. 19, 2018, the contents of which are incorporated by reference herein.

OVERVIEW

The present disclosure relates to a fingerprint sensing device. Furthermore, the present disclosure relates to a corresponding method of producing a fingerprint sensing device. Fingerprint sensing devices, such as capacitive fingerprint sensors, may be integrated into resource-constrained devices, for example into smart cards, wearable devices, Internet of Things (IOT) devices, or smart grid devices. Adequate capacitive coupling and electrostatic discharge (ESD) protection represent challenges in such devices.

SUMMARY

In accordance with a first aspect of the present disclosure, a fingerprint sensing device is provided, comprising: a substrate; a fingerprint sensor placed on one side of the substrate; a coupling electrode placed on another side of the substrate, wherein said coupling electrode is arranged to provide a coupling capacitance between a surface of a finger and a circuit ground of said fingerprint sensor.

In an embodiment, the coupling electrode is further arranged to provide an electrostatic discharge path.

In an embodiment, the coupling electrode, when projected in a vertical direction on a horizontal plane in which the fingerprint sensor is placed, does not overlap with said fingerprint sensor.

In an embodiment, the coupling electrode, when projected in a vertical direction on a horizontal plane in which the fingerprint sensor is placed, surrounds said fingerprint sensor.

In an embodiment, the coupling electrode comprises at least one gap.

In an embodiment, the fingerprint sensor comprises a plurality of sensor elements formed by capacitive sense plates.

In an embodiment, the device further comprises an electrostatic discharge grid, wherein the coupling electrode is electrically coupled to said electrostatic discharge grid. In an embodiment, the coupling electrode is connected by a via and a conductive connection to said circuit ground.

In an embodiment, the device further comprises a coating on said other said of the substrate, wherein the coating has a thickness in the range of 5 μm to 50 μm.

In an embodiment, the coupling electrode is larger in area than the fingerprint sensor by a factor in the range of 1.5 to 4.

In an embodiment, the device is embedded in a T-shaped package.

In an embodiment, a smart card, a wearable device, an Internet of Things device, or a smart grid device comprises a fingerprint sensing device of the kind set forth.

In accordance with a second aspect of the present disclosure, a method of producing a fingerprint sensing device is conceived, comprising: placing a fingerprint sensor on one side of a substrate; placing a coupling electrode on another side of the substrate, wherein said coupling electrode is arranged to provide a coupling capacitance between a surface of a finger and a circuit ground of said fingerprint sensor.

In an embodiment, the coupling electrode is placed such that, when the coupling electrode is projected in a vertical direction on a horizontal plane in which the fingerprint sensor is placed, the coupling electrode does not overlap with said fingerprint sensor.

In an embodiment, the coupling electrode is placed such that, when the coupling electrode is projected in a vertical direction on a horizontal plane in which the fingerprint sensor is placed, the coupling electrode surrounds said fingerprint sensor.

DESCRIPTION OF DRAWINGS

Embodiments will be described in more detail with reference to the appended drawings, in which.

DESCRIPTION OF EMBODIMENTS

Figure 1:
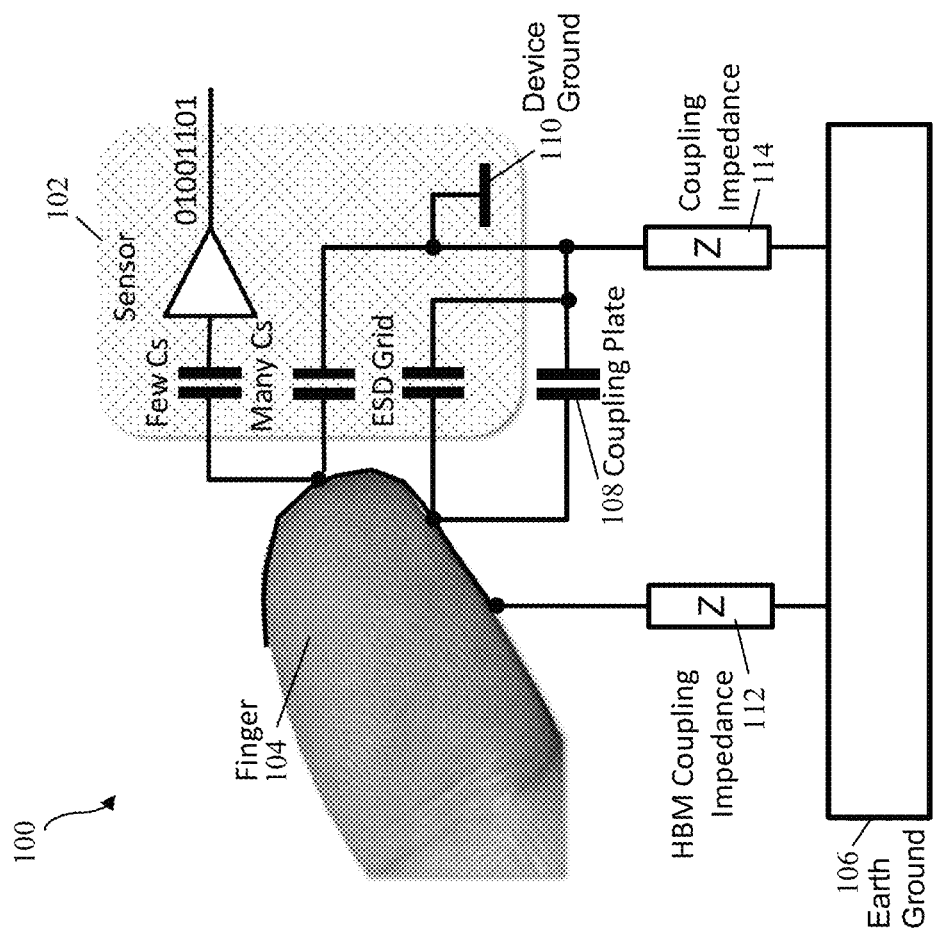
FIG. 1 shows an illustrative embodiment of a capacitive coupling model of a fingerprint sensing system.

Fingerprint-based user authentication is usually convenient and fast, and provides a positive user experience. Currently, fingerprint-based authentication is mainly enabled in high-performing mobile computing devices. However, it is expected that there exists a growing market potential for such authentication also in the domain of cost-sensitive and low-performing computing platforms. Thus, it would be useful to enable low-cost fingerprint-based user authentication. Fingerprint sensing devices, such as capacitive fingerprint sensors, may be integrated into resource-constrained devices, for example into smart cards, wearable devices, Internet of Things (IOT) devices, or smart grid devices. Adequate capacitive coupling and electrostatic discharge (ESD) protection represent challenges in such devices.

The integration of a fingerprint sensor into a smart card by a card manufacturer requires currently many expensive manufacturing process steps. For yield reasons, it may be required to insert the sensor after card lamination. This requires a certain sensor package that is configured to be mounted into a cavity that is milled into the smart card. A sensor package that is suited for such assembly methods is a so-called T-shaped package. Such a package comprises a carrier substrate which has overmolded components attached to the lower part of the substrate. The substrate area is substantially larger than the area covered by the overmolded components, thus ensuring that the thickness at the perimeter of the package is that of the substrate and not the sum of substrate thickness and mold thickness. This enables heat to be transferred from the top of said package to the bottom. This heat is required to activate an assembly process that may be a soldering process or a conductive gluing process. With a package having the thickness of the sum of substrate thickness and mold thickness it would be almost impossible to let heat transfer in a reasonable timeframe from the top of that package to its bottom to facilitate an assembly step.

Capacitive fingerprint sensors measure capacitances between the sensor's surface and a finger's surface interacting with the sensor. For achieving an adequate sensitivity, it is required to couple the finger's surface electrically to the sensor's circuit ground potential. For this purpose, a ring electrode is often used, which galvanically couples a drive signal into the finger's surface, which is utilized to measure the capacitance between the finger's surface and sensing electrodes inside the sensor. When packaging a sensor in a T-shaped package an insulating scratch protection should still be applied on top of the carrier substrate. The scratch protection layer often should be applied to the active sensing area of the carrier substrate, which requires a costly processing step. Furthermore, the overall optical appearance of the sensor does not comply with customer requirements of a uniform appearance.

Galvanic coupling electrodes often form a closed loop that may induce an alternating current if such coupling electrode is brought into an alternating magnetic field, as is the case when integrating fingerprint sensing functionality into a contactless fingerprint authentication card. The induced current will consume power from the supplying field, which will in turn reduce the amount of power that can be received by said contactless fingerprint authentication card. Increasing cost pressure requires that the size of fingerprint sensors is reduced. Since the coupling capacity is linked to the active sensing area, the coupling capacity reduces approximately linearly with the size of the sensing area. Thus, there is a conflict between the requirement of a small sensing area and the requirement of a high sensor sensitivity: reducing the sensing area often reduces the coupling capacitance, which in turn reduces the sensor's sensitivity. Now discussed is a device for reducing the sensing area without negatively affecting the sensor's sensitivity.

Therefore, in accordance with the present disclosure, a fingerprint sensing device is provided, comprising a substrate, a fingerprint sensor placed on one side of the substrate, and a coupling electrode placed on another side of the substrate. Furthermore, the coupling electrode is arranged to provide a coupling capacitance between a surface of a finger and a circuit ground of the fingerprint sensor. In this way, by adding a coupling electrode on the side of the substrate that is closer to the surface of the finger than the side on which the sensor is placed, an adequate capacitive coupling is achieved between the sensor's circuit ground and the finger's surface potential, while the area of the sensor can still be minimized. Furthermore, the capacitive coupling achieved by the coupling electrode is insensitive to variations of the carrier substrate thickness.

In an embodiment, the coupling electrode is further arranged to provide an electrostatic discharge (ESD) path. In particular, by adding the coupling electrode on the side of the substrate that is closer to the surface of the finger than the side on which the sensor is placed, an improved ESD protection can also be achieved, because the coupling electrode effectively provides a discharge path in close proximity of the finger. In a practical and effective implementation, the coupling electrode is connected by a via in the substrate and a conductive connection to the circuit ground. In integrated circuit design, a via is a small opening in an insulating layer that allows a conductive connection between different layers.

FIG. 1 shows an illustrative embodiment of a capacitive coupling model 100 of a fingerprint sensing system. In a practical and effective implementation, a fingerprint sensor 102 comprises a plurality of sensor elements formed by capacitive sense plates (not shown). Thus, the behavior of the fingerprint sensor 102 can be modeled by a plurality of capacitances $C_s$, a few of which will be active when a finger 104 comes into proximity of the sensor 102, and many of which will not be active. Both the sensor and the finger 104 are coupled to earth ground 106, modeled by coupling impedance 114 and Human Body Model (HBM) coupling impedance 112, respectively. The model parameter HBM coupling impedance is taken from the standardized HBM model, which defines a method for rating ICs for ESD in manufacturing environments. HBM is intended to simulate a person becoming charged and discharging from a bare finger to ground through a circuit under test. A specific standard that defines HBM is the international JEDEC standard JS-001. The sensor 102 also comprises an ESD grid, which is modeled as a capacitance as well. Both the non-active sense plates and the ESD grid are coupled to device ground 110 (i.e., circuit ground). In accordance with the present disclosure, a coupling electrode 108 is provided (i.e., a coupling plate). The coupling electrode 108 is also coupled to device ground 110. Since the coupling electrode 108 provides a coupling capacitance between the surface of the finger 104 and device ground 110, it is also modeled by a capacitance.

Figure 2:
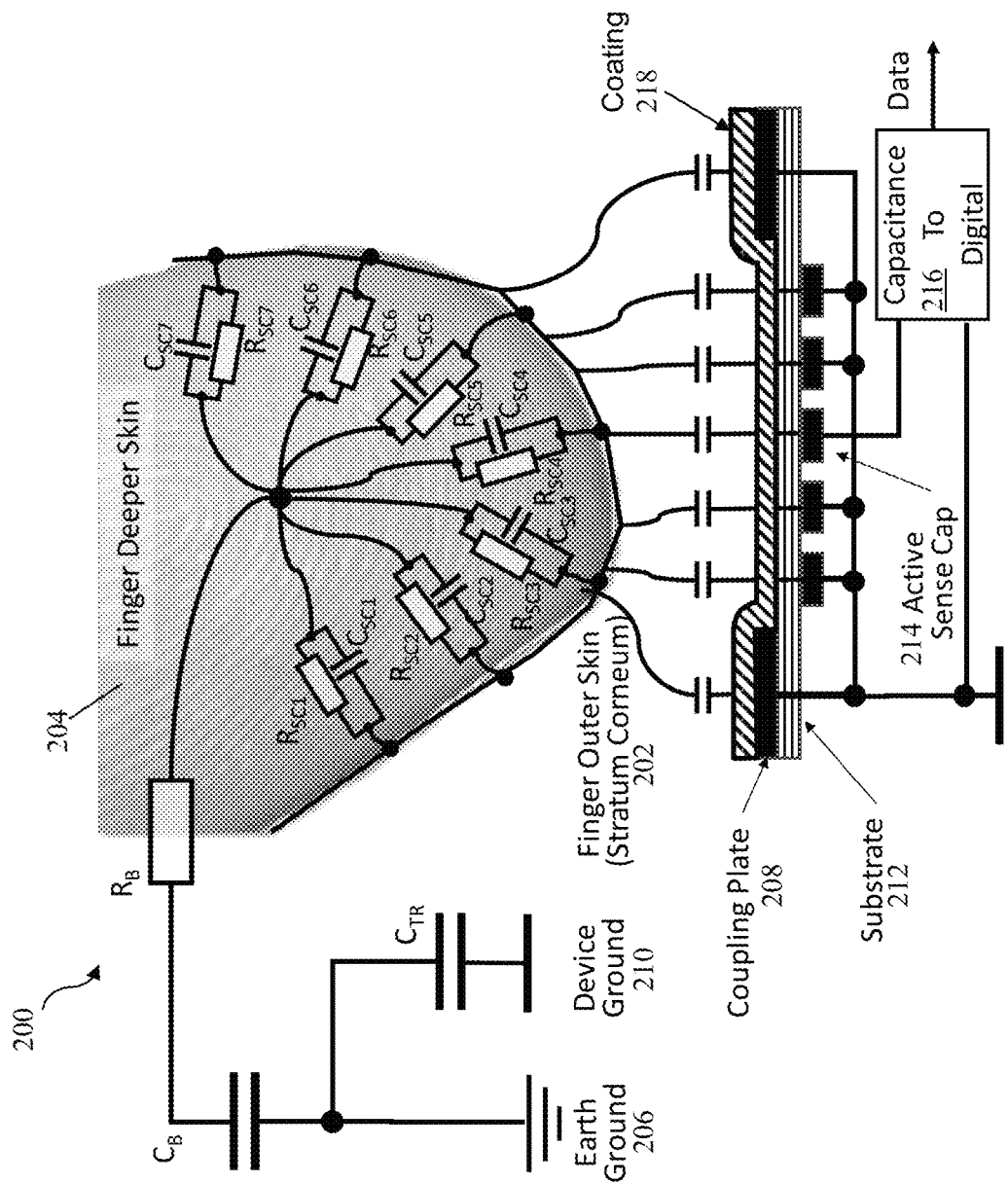
FIG. 2 shows another illustrative embodiment of a capacitive coupling model of a fingerprint sensing system.

FIG. 2 shows another illustrative embodiment of a capacitive coupling model 200 of a fingerprint sensing system. A carrier substrate 212, which may be made of polyimide or another insulating material, may be configured to have a coupling plate 208 (i.e., a coupling electrode) made of a conductive material (e.g., copper) that is placed on the substrate's surface which faces the finger 204. The capacitance developing between an active sense plate 214 and circuit ground is measured by a capacitance-to-digital-data converter 216 and the resulting data are further processed by extracting fingerprint features from them. For achieving high-quality measurements, it is important to realize an adequate capacitive coupling between the finger's outer skin 202 and circuit ground. More specifically, it is important to achieve a coupling capacitance that is significantly higher than the capacitance to be evaluated on the capacitive sense plates. This may be achieved by a coupling plate 208 of the kind set forth.

The outer skin of the finger is modeled by capacitors $C_{SCi}$ and resistors $R_{SCi}$ that are connected in parallel. One coupling path comprises a body resistance $R_B$, a body coupling capacitance $C_B$ to earth potential 206 and an assumed transformer's winding capacitance $C_{TR}$ between earth potential 206 and circuit ground 210. The capacitance $C_{TR}$ represents the coupling capacitance between earth potential 206 and the sensor's circuit ground, regardless of whether a transformer or other circuit elements are used. Another coupling path may comprise the capacitance that develops between the finger's surface 202 and the coupling plate 208 in accordance with the present disclosure. The coupling plate 208 is elevated above the sensor chip components (e.g., the capacitive sense plates) and thus it is located closer to the finger than the sensor chip components. Therefore, the coupling plate 208 may provide a large coupling capacitance. Furthermore, since this coupling plate 208 is positioned close to the finger's surface it may also act as an additional ESD discharge electrode, thus improving the ESD protection level.

Another coupling path comprises the capacitive sense plates that are not being utilized for capacitance measurements at a given moment in time; these non-active sense plates may thus be configured to provide an additional coupling capacitance. The total capacity of all sense plates configured as coupling capacitors may vary with the size of the sensing area and the thickness of the insulating carrier substrate 212. The coupling provided by the coupling plate 208 may be made relatively large compared to the coupling provided by sense plates configured as coupling capacitors, because its area may be made relatively large—about 1.5 to 4 times larger than the area occupied by the sense plates taken together—and the average distance between the coupling plate 208 and the finger's surface 202 may be made relatively small (10-20 μm) by minimizing the thickness of a coating layer 218 placed on the substrate 212 and the coupling plate 208. A suitable thickness range for the coating layer 218 to achieve this effect is 5 μm to 50 μm. As mentioned, the area occupied by the coupling plate 208 may be about 1.5 to 4 times larger than the area occupied by the sense plates taken together. For example, in practical implementations, the factor may be 2 for a 14×14 mm² T-shape with a sensor surface of 8×8 mm², and the factor may be 4 for a similar T-shape with a sensor surface of 5.8×5.8 mm².

Figure 3A:
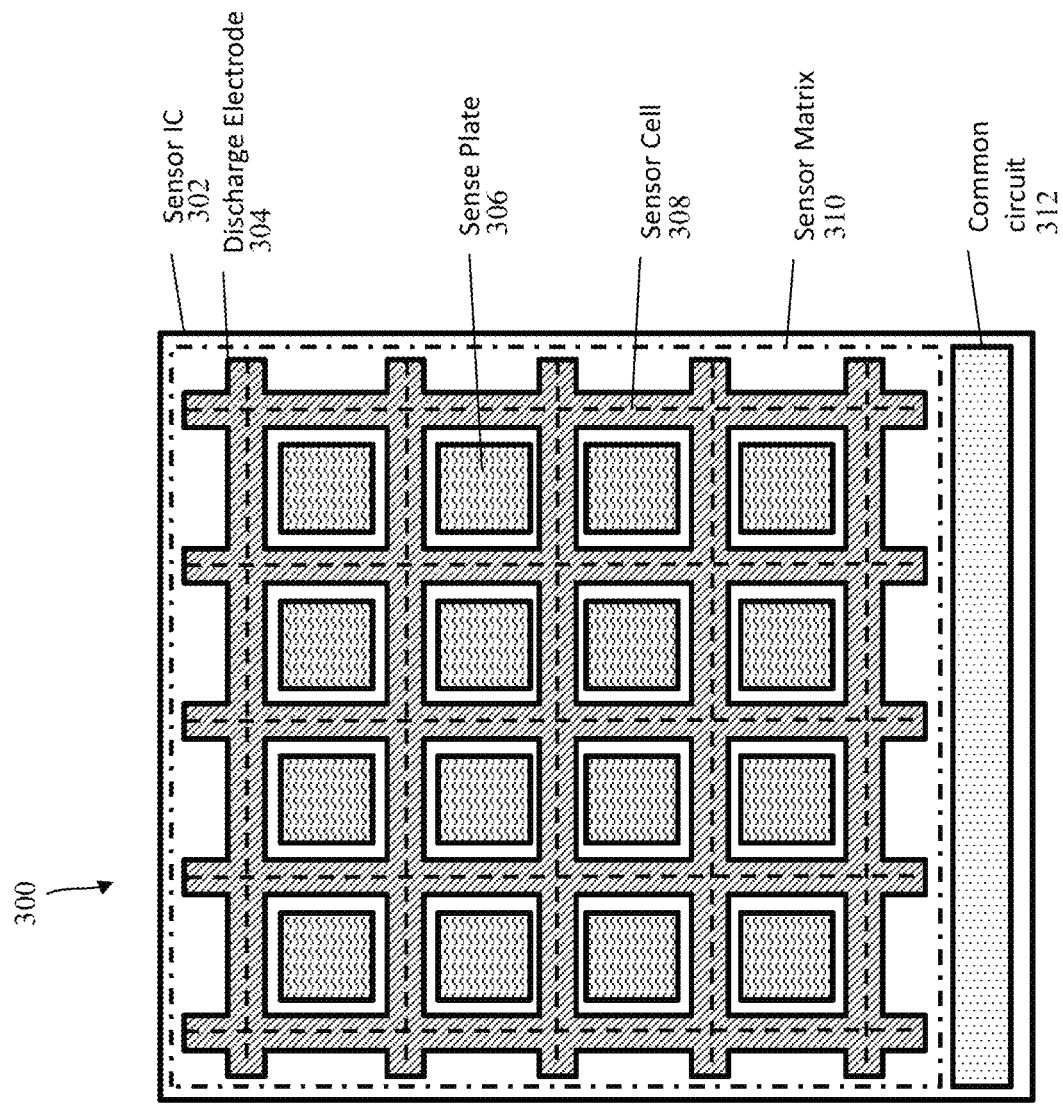
FIG. 3A shows an example of a fingerprint sensing device.
Figure 3B:
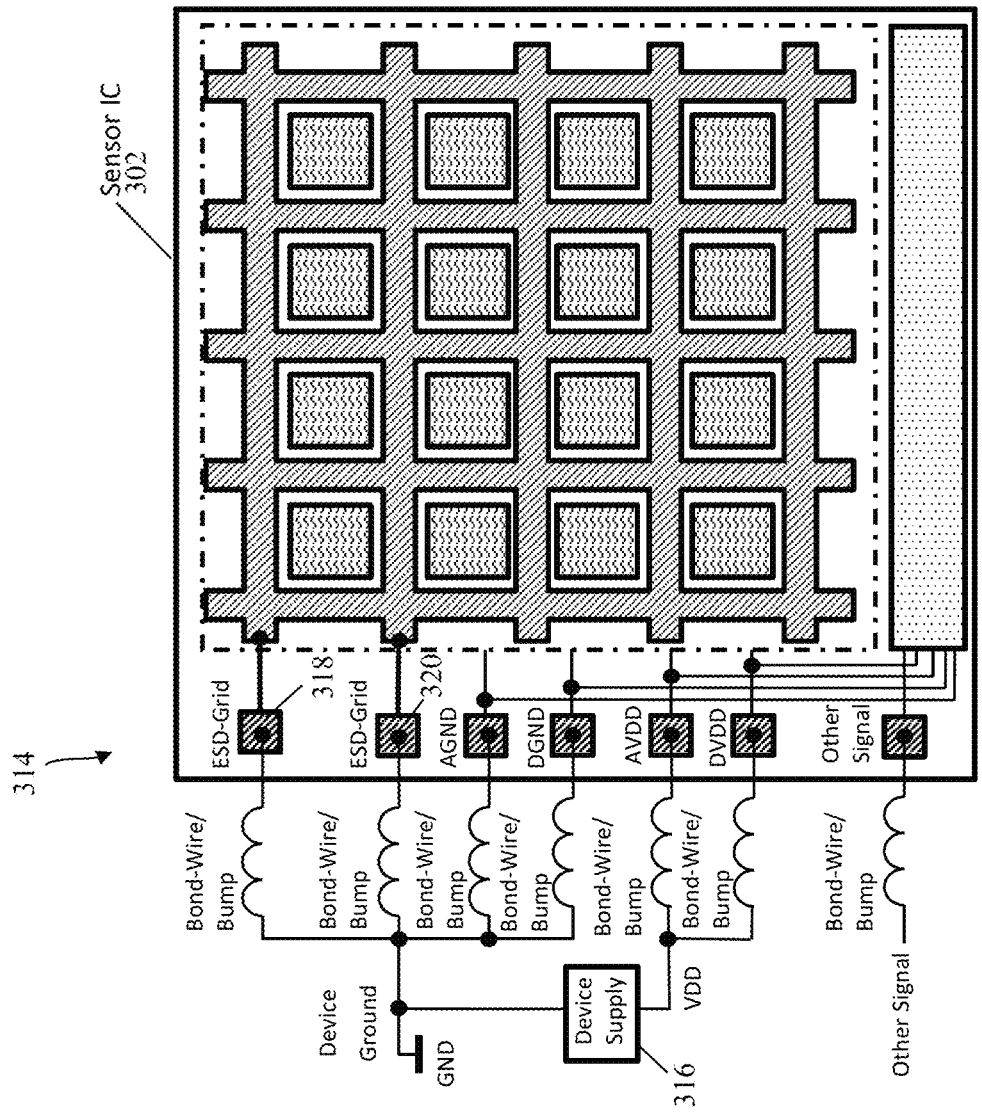
FIG. 3B shows another example of a fingerprint sensing device.
Figure 3C:
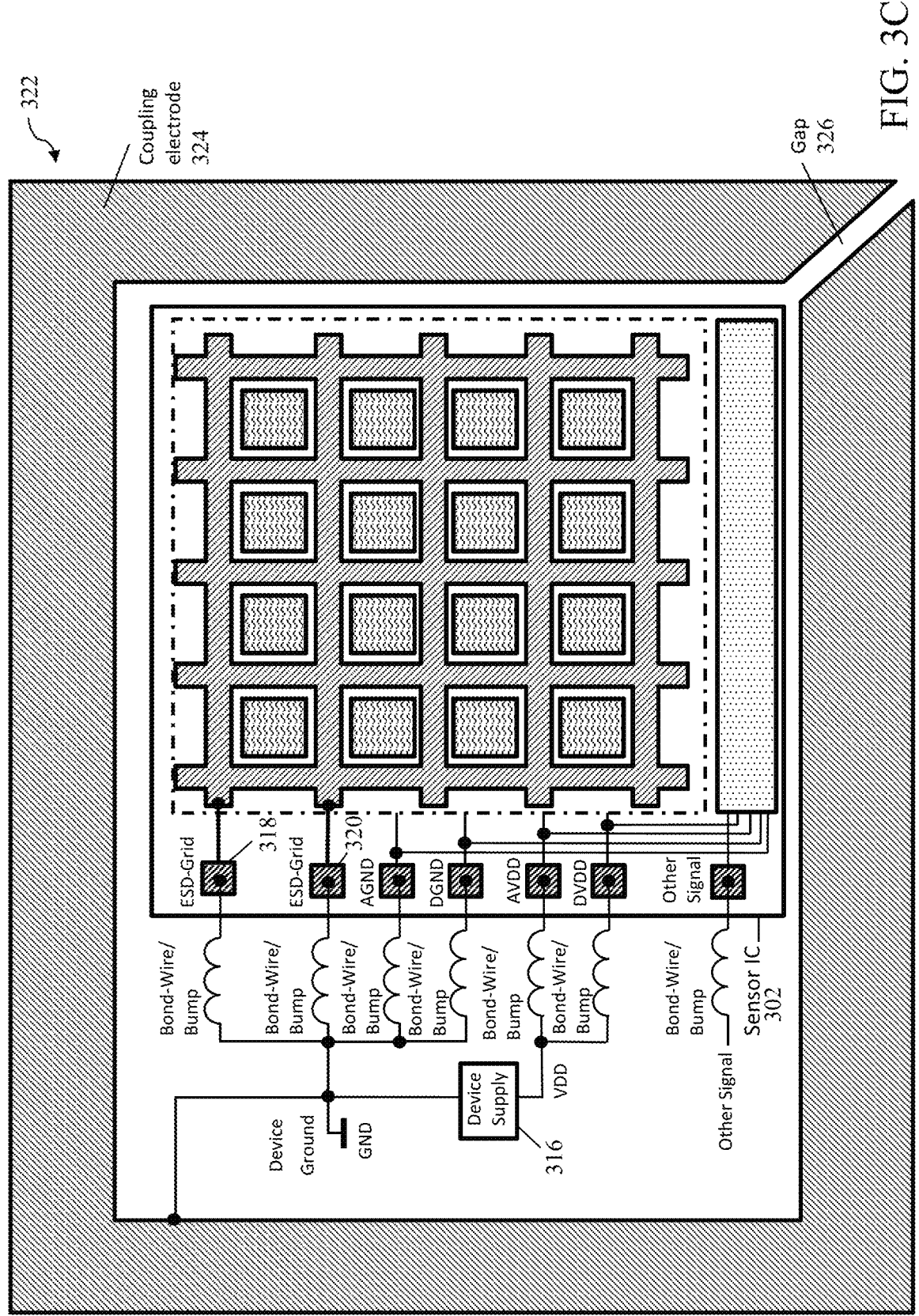
FIG. 3C shows an illustrative embodiment of a fingerprint sensing device.

FIGS. 3A to 3C show illustrative embodiments of a fingerprint sensing device. The fingerprint sensing device 300 shown in FIG. 3A comprises a sensor integrated circuit (IC) 302. The sensor IC 302 comprises a plurality of sensor cells 308. The sensor cells 308 comprise sense plates 306. Furthermore, the plurality of sensor cells 308 is organized as a sensor matrix 310. Furthermore, in accordance with the present disclosure, the sensor IC 302 may comprise a discharge electrode 304. In this embodiment, the discharge electrode 304 is common to all sensor cells 408 and forms a grid. Furthermore, the sensor IC 302 comprises a circuit 312 that is common to all sensor cells 308 and that may be used, for example, to control the sensor cells 408 and to collect measurement results from the sensor cells 308. In this example, the ESD stress may be first lowered by the grid connected to system ground, by flowing a discharge current through the system ground. Furthermore, the ESD stress may be lowered through a coupling electrode of the kind set forth, as shown in FIG. 3C.

FIG. 3B shows another illustrative embodiment of a fingerprint sensing device 314. In the embodiments illustrated in FIGS. 3A to 3C, the fingerprint sensing device 300, 314, 322 comprises a common circuit 112 and an array of sensor cells 308 configured to measure the capacitance between a sense plate 306 of the sensor cells 308 and the surface of a finger (not shown). The sensor cells 308 are organized as a matrix having i*j sensor cells 308, arranged in i rows and j columns. As shown in FIG. 3B, the ESD electrodes of all i*j sensor cells form an ESD electrode grid, which is connected through contact pads 318, 320, bonding wires and/or bumps to a ground potential external to the fingerprint sensing device. In an embodiment, multiple bonding wires are connected in parallel to reduce the coupling inductance. The ESD grid provides coupling capacitance to the charged finger. Multiple bonding wires/bumps connected to the ESD grid also facilitate providing a higher current carrying capability for the ESD grid. The common circuit and circuits within the sensor cell matrix are provided with separate analog and digital supply voltage and ground connection using separate IO pad cells AGND, DGND, AVDD, DVDD, and bonding wires/bumps to avoid noise coupling.

FIG. 3C shows another illustrative embodiment of a fingerprint sensing device 322. The fingerprint sensing device 322 comprises, in addition to the elements shown in FIG. 3B, a coupling electrode 324 surrounding the sensor IC 302. In particular, as will be explained in more detail with reference to FIG. 4, the coupling electrode 324 surrounds the sensor 302 when it is projected in a vertical direction on a horizontal plane in which the sensor 302 is placed. In this way, the capacitive coupling achieved by the coupling electrode 324 can be increased. Furthermore, to avoid that the sensor's surface is obstructed, the coupling electrode 324 does not overlap with the sensor 302 when it is projected in a vertical direction on a horizontal plane in which the sensor 302 is placed. The coupling electrode 324 is coupled to circuit ground (i.e. device ground). Furthermore, the coupling electrode 324 comprises a gap 326. In an embodiment, the coupling electrode comprises at least one gap. A closed loop electrode may cause an unwanted power sink in case the sensor is supplied by energy from an alternating magnetic field. By inserting one or more gaps in the surrounding coupling electrode, the risk that such a power sink occurs is reduced.

Figure 4:
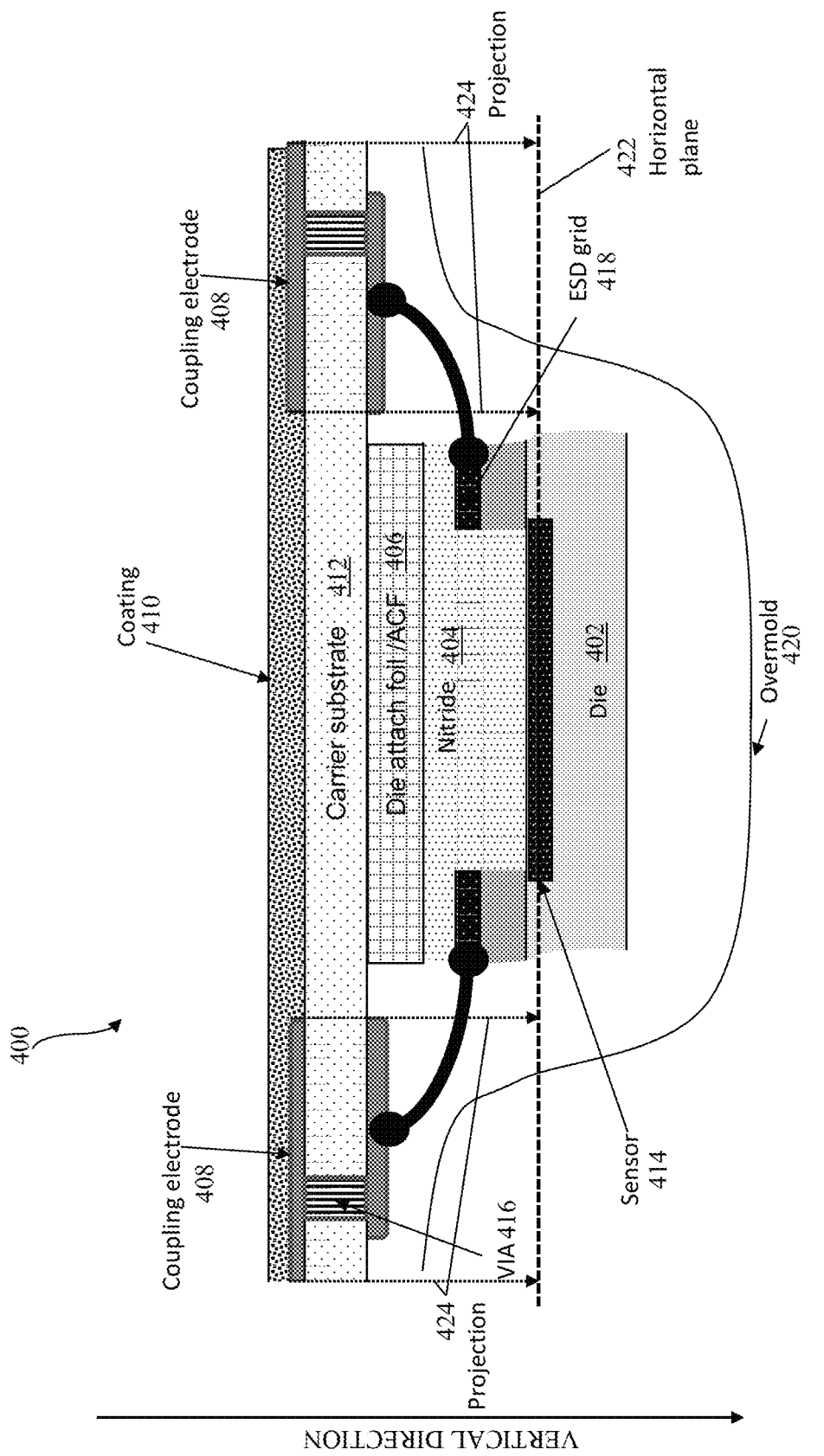
FIG. 4 shows an illustrative embodiment of a T-shaped package.

FIG. 4 shows an illustrative embodiment of a T-shaped package 400. A sensor die 402 is assembled underneath a carrier substrate 412 by applying a die attach foil or anisotropic conductive film (ACF) 406, or another suitable direct-chip-attach method, with its sensor 414 (i.e., capacitive sensing electrodes) facing the carrier substrate 412. A nitride layer 404 may be provided between the die attach foil or ACF 406 and the sensor 414. As shown schematically, the coupling electrode 408 on top of the carrier substrate 412 may be connected by means of a via 416 and a suitable conductive connection to circuit ground of the sensor chip 402. In case the sensor chip 402 comprises a grounded ESD grid 418, the coupling electrode 408 may also be connected to said ESD grid 418. The coupling plate 408 and, if present, the ESD grid 418, are connected to the sensor's circuit ground. A coating 410 may cover the coupling electrode 408 and the carrier substrate 412. An overmold 420 completes the T-shaped package 400. Furthermore, as also described with reference to FIG. 3C, the coupling electrode 408 may surround the sensor 414 when it is projected 424 in a vertical direction on a horizontal plane 422 in which the sensor 414 is placed. In this way, the capacitive coupling achieved by the coupling electrode 408 can be increased. Furthermore, to avoid that the surface of the sensor 414 is obstructed, the coupling electrode 408 does not overlap with the sensor 414 when it is projected 424 in a vertical direction on a horizontal plane 422 in which the sensor 414 is placed. In FIG. 4, it is shown that the vertical projections 424 of the coupling electrode 408 on the horizontal plane 422 in which the sensor 414 is placed, do not overlap said sensor 414. In this cross-section it cannot be seen that the projected coupling electrode 408 surrounds the sensor 414; however, this can be seen in the top views shown in FIG. 3C and FIG. 5. The T-shaped package 400 facilitates the integration of the fingerprint sensor in, for example, a smart card.

Figure 5:
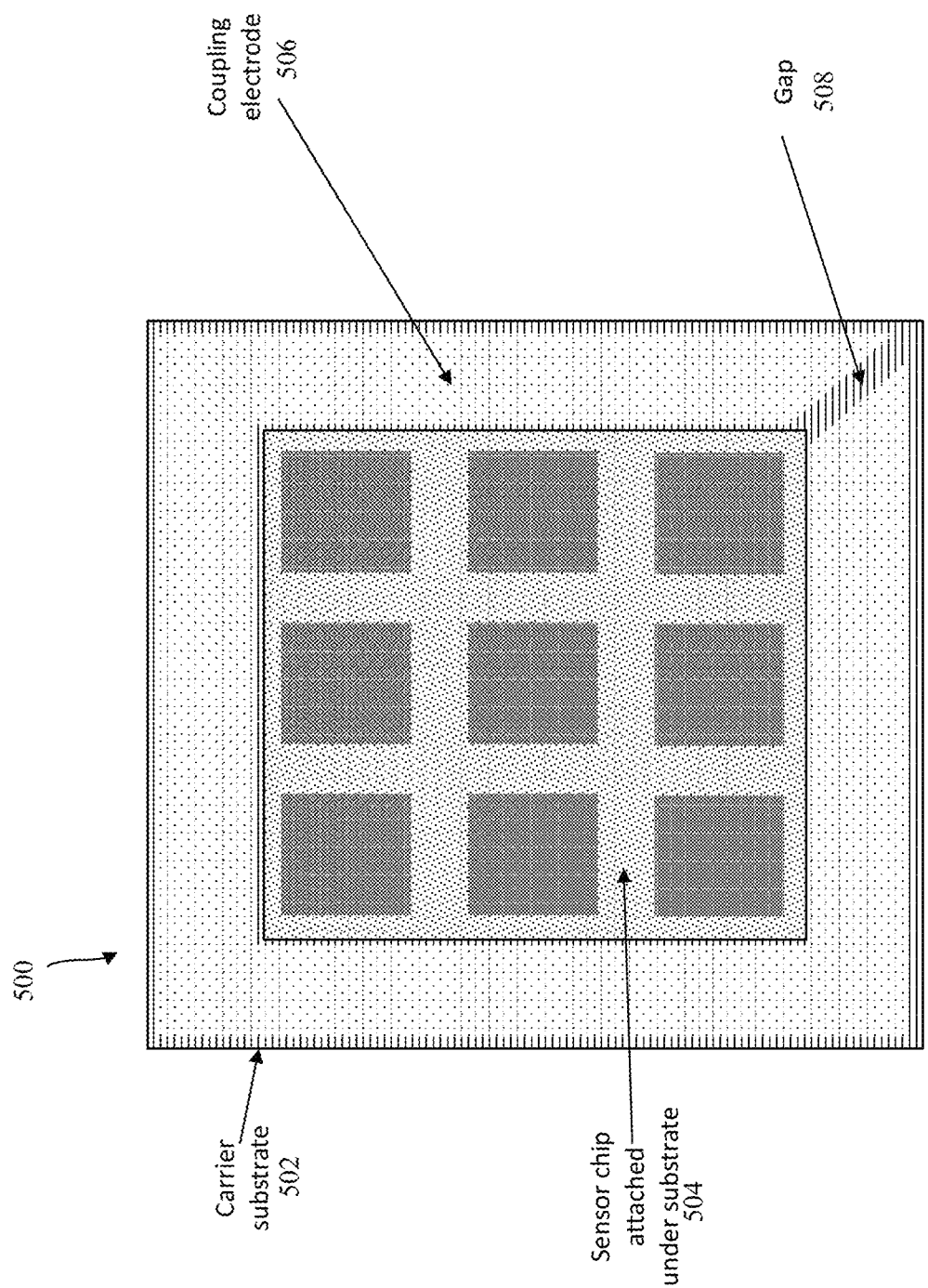
FIG. 5 shows an illustrative embodiment of a top view of the T-shaped package.

FIG. 5 shows an illustrative embodiment of a top view 500 of the T-shaped package 400 shown in FIG. 4. A coupling electrode 506 is placed on a carrier substrate 502. In this embodiment, the coupling electrode 506 comprises a gap 508. Furthermore, a sensor chip 504 is attached under the carrier substrate 502. Thus, in accordance with the present disclosure, the fingerprint sensor (i.e. the sensor chip 504) is placed on a side of the carrier substrate 502 which is different from the side of the carrier substrate 502 on which the coupling electrode 506 is placed.

Figure 6:
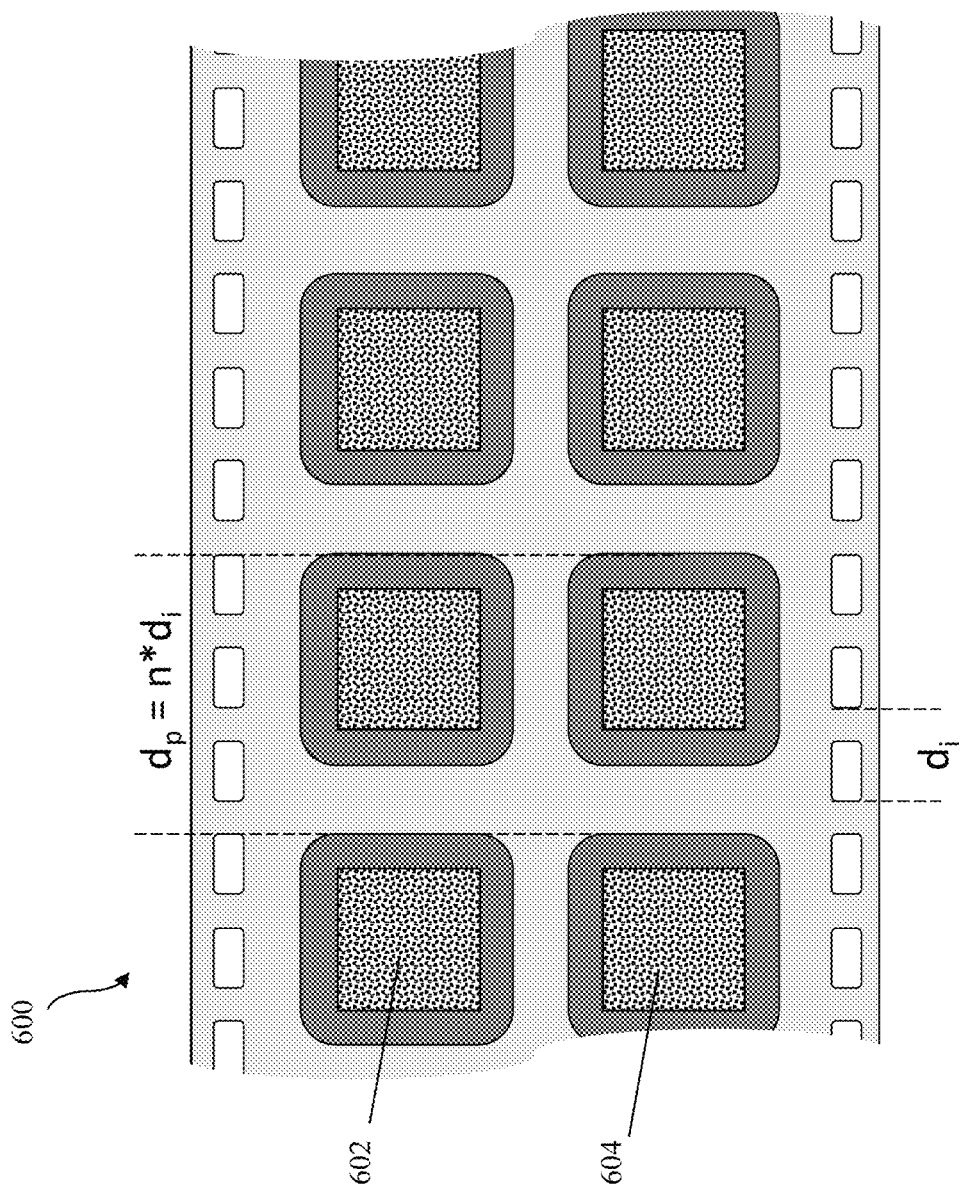
FIG. 6 shows an illustrative embodiment of an index tape.

FIG. 6 shows an illustrative embodiment of an index tape 600. In this embodiment, the width and length of T-shaped packages containing sensor modules are such that two of said sensor modules 602, 604 fit to the width of the index tape 600, and the distance $d_p$ between two modules in the longitudinal tape direction fit to a multiple n of the index hole distance $d_i$, which enables designing a simplified punch, pick and place process for the assembly of said T-shaped packages.

Figure 7:
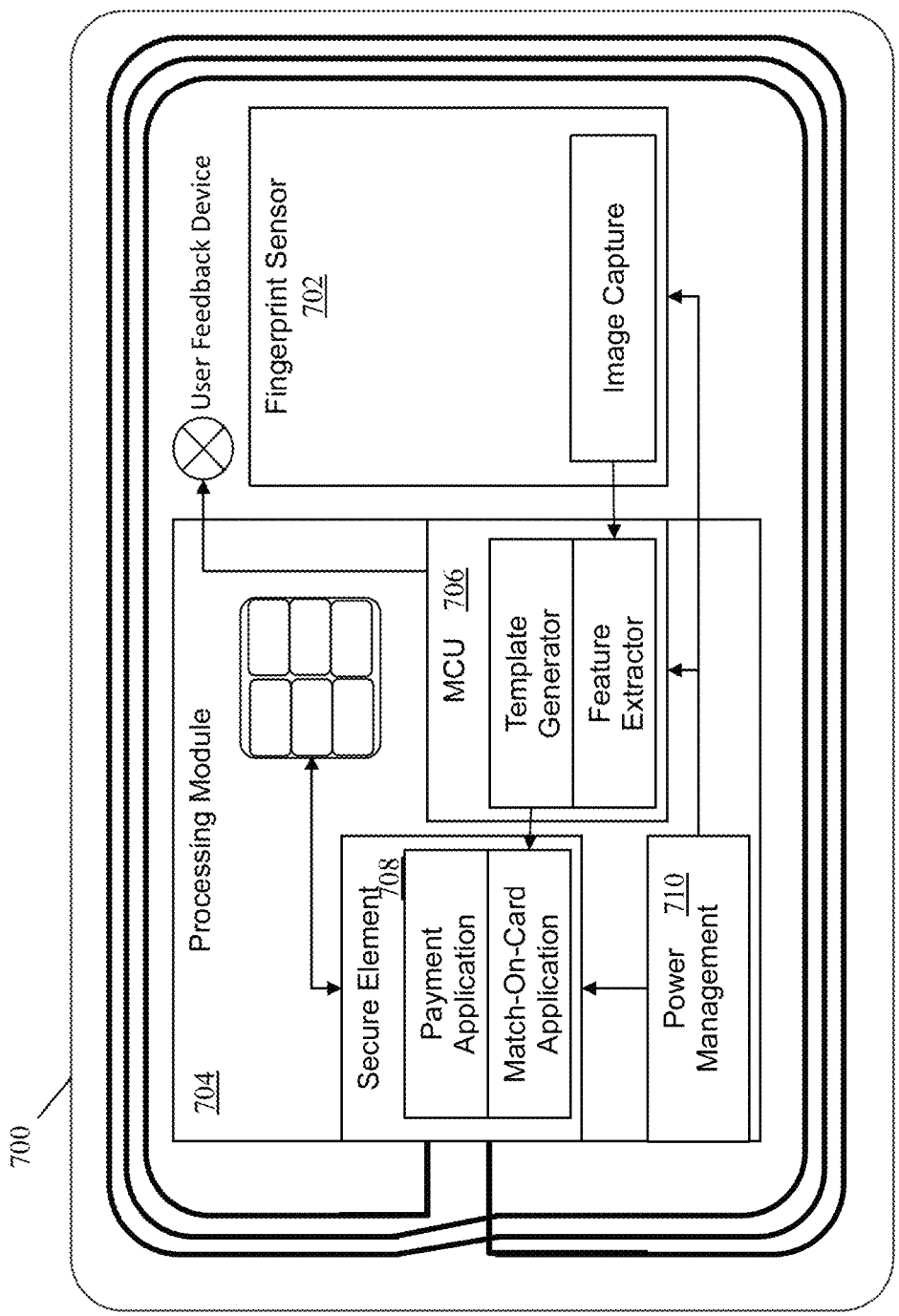
FIG. 7 shows an illustrative embodiment of a smart card.

FIG. 7 shows an illustrative embodiment of a smart card 700. The smart card 700 comprises a fingerprint sensor 702, which may be a fingerprint sensing device of the kind set forth herein. The fingerprint sensor 702 is embedded into a smart card 700 together with a processing module 704 that may perform different functions. The processing module 704 comprises a processing unit (i.e., microcontroller) 706, a secure element 708, and a power management unit 710. An image capture unit of the fingerprint sensor 702 is configured to capture a fingerprint image. The secure element 708 may execute a payment application requesting authentication from a fingerprint-match-on-card application, wherein said fingerprint-match-on card application communicates with the MCU 706 to obtain a fingerprint feature list for matching against a fingerprint reference feature list that is securely stored in the secure element 708. The MCU 706 communicates with the fingerprint sensor 702 in order to receive an electronic representation of a fingerprint pattern. The MCU 706 is further configured to process said electronic representation of a fingerprint pattern in order to extract features from said representation and converting them into said feature list in a machine-readable format. The MCU 706 may furthermore provide user feedback through a user feedback device, to guide the fingerprint imaging process. The secure element 708 may communicate through an ISO-7816 and/or ISO-14443 interface with a payment network and/or an identification network (not shown).

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 capacitive coupling model of a fingerprint sensing system
102 sensor
104 finger
106 earth ground
108 coupling plate
110 device ground
112 HBM coupling impedance
114 coupling impedance
200 capacitive coupling model of a fingerprint sensing system
202 outer skin of finger (stratum corneum)
204 deeper skin of finger
206 earth ground
208 coupling plate
210 device ground
212 substrate
214 active sense capacitor
216 capacitance to digital data converter
218 coating
300 fingerprint sensing device
302 sensor IC
304 discharge electrode
306 sense plate
308 sensor cell
310 sensor matrix
312 common circuit
314 fingerprint sensing device
316 device supply
318 ESD grid contact pad
320 ESD grid contact pad
322 fingerprint sensing device
324 coupling electrode
326 gap
400 T-shaped package
402 die
404 nitride layer
406 die attach foil/ACF
408 coupling electrode
410 coating
412 carrier substrate
414 sensor
416 VIA
418 ESD grid 420 overmold
422 horizontal plane
424 projection
500 top view of T-shaped package
502 carrier substrate
504 sensor chip attached under substrate
506 coupling electrode
508 gap
600 index tape
602 sensor module
604 sensor module
700 smart card
702 fingerprint sensor
704 processing module
706 microcontroller
708 secure element
710 power management unit

The invention claimed is:

1. A fingerprint sensing device comprising:
 a substrate;
 a fingerprint sensor placed on one side of the substrate;
 a coupling electrode placed on another side of the substrate, wherein said coupling electrode is arranged to provide a coupling capacitance between a surface of a finger and a circuit ground of said fingerprint sensor, wherein the fingerprint sensing device is fixed to an index tape for facilitating embedding the fingerprint sensing device in a smartcard, wherein the index tape has a plurality of regularly spaced index holes in a longitudinal tape direction in a line on both edges of the index tape, and wherein a first dimension of the device is a multiple of a distance between each hole of the plurality of regularly spaced index holes.

2. The device of claim 1, wherein the coupling electrode is further arranged to provide an electrostatic discharge path.

3. The device of claim 1, wherein the coupling electrode, when projected in a vertical direction on a horizontal plane in which the fingerprint sensor is placed, does not overlap with said fingerprint sensor.

4. The device of claim 1, wherein the coupling electrode, when projected in a vertical direction on a horizontal plane in which the fingerprint sensor is placed, surrounds said fingerprint sensor.

5. The device of claim 1, wherein the coupling electrode comprises at least one gap.

6. The device of claim 1, wherein the fingerprint sensor comprises a plurality of sensor elements formed by capacitive sense plates.

7. The device of claim 1, further comprising an electrostatic discharge grid, wherein the coupling electrode is electrically coupled to said electrostatic discharge grid.

8. The device of claim 1, wherein the coupling electrode is connected by a via and a conductive connection to said circuit ground.

9. The device of claim 1, further comprising a coating on said other side of the substrate, wherein the coating has a thickness in the range of 5 µm to 50 µm.

10. The device of claim 1, wherein the coupling electrode is larger in area than the fingerprint sensor by a factor in the range of 1.5 to 4.

11. The device of claim 1, being embedded in a T-shaped package.

12. A smart card, a wearable device, an Internet of Things device, or a smart grid device comprising the fingerprint sensing device of claim 1.

13. The device of claim 1, wherein a second dimension of the device permits two devices to fit on a width of the index tape.

14. A method of producing a fingerprint sensing device:
 placing a fingerprint sensor on one side of a substrate;
 placing a coupling electrode on another side of the substrate, wherein said coupling electrode is arranged to provide a coupling capacitance between a surface of a finger and a circuit ground of said fingerprint sensor, wherein the fingerprint sensing device is fixed to an index tape for facilitating embedding the fingerprint sensing device in a smartcard, wherein the index tape has a plurality of regularly spaced index holes in a longitudinal tape direction in a line on both edges of the index tape, and wherein a first dimension of the device is a multiple of a distance between each hole of the plurality of regularly spaced index holes.

15. The method of claim 14, wherein the coupling electrode is placed such that, when the coupling electrode is projected in a vertical direction on a horizontal plane in which the fingerprint sensor is placed, the coupling electrode does not overlap with said fingerprint sensor.

16. The method of claim 15, wherein the coupling electrode is placed such that, when the coupling electrode is projected in a vertical direction on a horizontal plane in which the fingerprint sensor is placed, the coupling electrode surrounds said fingerprint sensor.

17. The method of claim 14, wherein a second dimension of the device permits two devices to fit on a width of the index tape.

\* \* \* \* \*